No. 634,573. Patented Oct. 10, 1899.
J. S. COPELAND.
EXTENSIBLE CRANK FOR VELOCIPEDES.
(Application filed Jan. 9, 1894.)
(No Model.) 2 Sheets—Sheet 1.
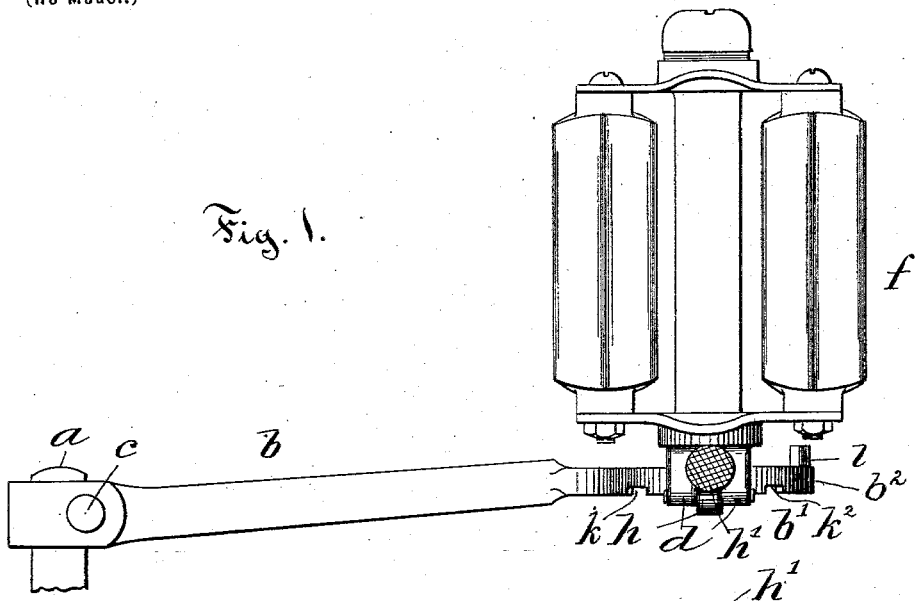
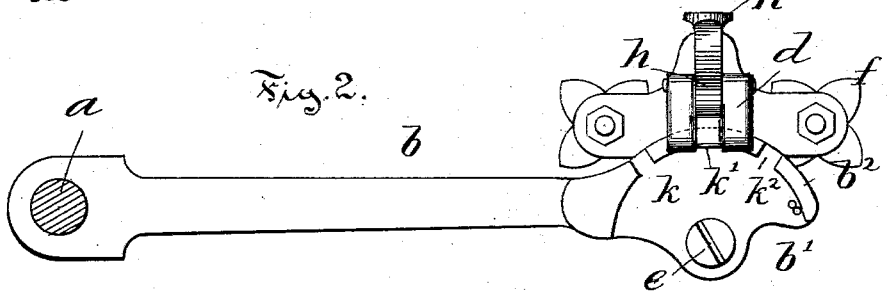
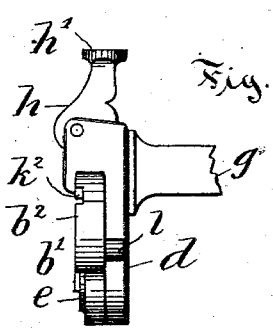 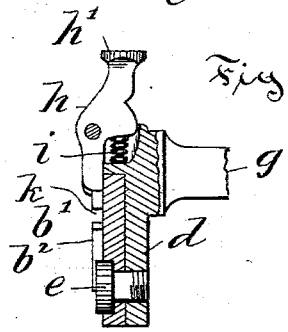
Witnesses:
Joseph Arthur Cantin.
Arthur B. Jenkins.
Inventor:
James S. Copeland,
By Chas. L. Burdett,
Attorney.
THE NORRIS PETERS CO., PHOTO-LITHO., WASHINGTON, D. C.

No. 634,573. Patented Oct. 10, 1899.
J. S. COPELAND.
EXTENSIBLE CRANK FOR VELOCIPEDES.
(Application filed Jan. 9, 1894.)

(No Model.) 2 Sheets—Sheet 2.

Witnesses:
Joseph Arthur Cantin.
Arthur B. Jenkins,

Inventor
James S. Copeland
by Chas. L. Burdett,
Attorney.

UNITED STATES PATENT OFFICE.

JAMES S. COPELAND, OF HARTFORD, CONNECTICUT, ASSIGNOR TO THE POPE MANUFACTURING COMPANY, OF BOSTON, MASSACHUSETTS.

EXTENSIBLE CRANK FOR VELOCIPEDES.

SPECIFICATION forming part of Letters Patent No. 634,573, dated October 10, 1899.

Application filed January 9, 1894. Serial No. 496,327. (No model.)

*To all whom it may concern:*

Be it known that I, JAMES S. COPELAND, of Hartford, in the county of Hartford and State of Connecticut, have invented certain new and useful Improvements in Extensible Cranks for Velocipedes, of which the following is a full, clear, and exact description, whereby any one skilled in the art can make and use the same.

My invention relates more particularly to the class of devices provided for changing the leverage in mechanisms where power is applied to a shaft by means of a crank; and it is described in the within specification as embodied in the driving mechanism of a velocipede or like foot-driven vehicle.

The particular object of my invention is to provide an extensible crank-arm for a bicycle or like vehicle with the parts so arranged as to permit the ready change of leverage by means of the foot of the rider of the vehicle and while the vehicle is in motion.

Figure 5:
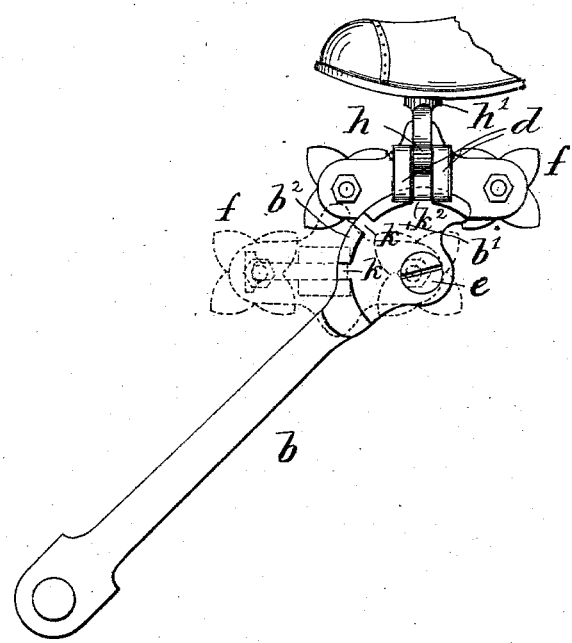
Figure 6:
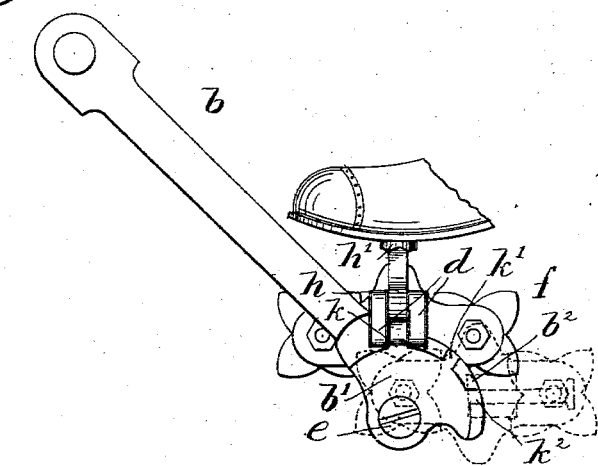

Referring to the accompanying drawings, forming part hereof, Figure 1 is a detail top or plan view of the right-hand crank of a bicycle, showing the pedal-block midway between the extreme limits of its adjustment. Fig. 2 is a detail front or side view of the crank with the parts in the same relative position as shown in Fig. 1. Fig. 3 is a detail end view of the crank-arm and inside view of the pedal-block, the pedal being removed and the pedal-pin broken off. Fig. 4 is a detail view, in vertical central section, through the parts shown in Fig. 3 on a plane passing through the axis of the pedal-pin and at right angles to the line of the crank-arm. Fig. 5 is a side view looking outward from the wheel and showing the position of the crank-arm most convenient for shortening the leverage; and Fig. 6 is a side view of the crank-arm, showing the position of the parts most convenient for lengthening the crank-arm.

In the drawings the letter $a$ denotes the crank-shaft, to which a crank-arm $b$ is secured, as by means of a pin $c$ or in any other convenient manner. The outer end $b'$ of the crank-arm is broadened to support the adjustable pedal-block $d$, which is pivoted, as by means of a pivot-pin $e$, to this outer end of the crank-arm in such manner as to permit a movement of the pedal-pin toward or from the line of the axis of the crank-shaft, and thus shorten or lengthen the crank-arm, the power being applied in the within-described form of the mechanism through the medium of the pedal $f$, which is supported on the pedal-pin $g$. The pedal $f$ is fitted to rotate freely on the pedal-pin and is of any usual or convenient form.

The pedal-block $d$ is fitted to the outer surface of the outer end $b'$ of the crank-arm and has a swinging movement parallel to the flattened side, the head of the pedal-block overlying the edge $b^2$ and having an undercut side, so that the block hooks over the edge $b^2$. In the head of the pedal-block a pawl $h$ is pivoted, and it is held, as by means of a spring $i$, with its lower end normally adapted to engage either of the sockets or locking-faces $k$, $k'$, or $k^2$, which are formed in a flange at the edge of the broadened end $b'$ of the crank-arm. The head $h'$ of the pawl is located in a convenient and accessible position, so as to enable the pawl to be disengaged from a pawl-socket by downward pressure on this head, and the pawl may be operated, as by means of the foot of the rider of a bicycle, by placing the foot upon the head of the pawl and pushing it downward.

The swinging movement of the pedal-block is limited at the outer end by a stop $l$, arranged in the path of movement of the block and by the edge of the crank-arm, against which the side of the pedal-block strikes at the inner end of the throw. In the form shown the crank-arm is provided with three pawl-sockets, which give to the pedal-pin three different positions of adjustment and enable the crank-arm to be adjusted to three different lengths of leverage, but the device is not limited to any particular extent of throw of the block nor to the number of positions of the adjustment, although in practice a throw of about one and one-half inches and but two positions of adjustment are preferred as most convenient for the purpose.

When the invention is embodied in a velocipede-crank, its operation is as follows: Starting with the crank-arm at its greatest length and with the pedal-block at the outer limit of its play, as illustrated in Fig. 5 of the drawings, as the crank rises to a position at about forty-five degrees (45°) above the horizontal the foot may be applied to the top of the pawl, and by a slight downward pressure the lower end of the pawl is disengaged from the socket $k^2$. A continued pressure of the foot swings the pedal-block to the desired extent as to the final inner position on the crank-arm, (shown in dotted outlines in Fig. 5,) and the foot may then be removed from the head of the pawl and applied to the pedal, the leverage of the crank-arm having thereby been reduced from its greater to its lesser length.

In case it is desired to lengthen the leverage the foot may be applied to the head of the pawl $h$ just as the crank-arm begins to rise in passing a position at about forty-five degrees (45°) with the vertical plane and below the horizontal plane of the crank-shaft. Downward pressure upon the pawl disengages its lower end from the pawl-socket $k$ and enables the block to be swung downward and outward into the position designated in dotted outline in Fig. 6, the latter being the outward limit of the permissible movement of the block, and the pedal is thereby set in a position giving the crank-arm its greatest leverage.

When a bicycle or other velocipede is being driven along a comparatively level road, speed is gained by rapid revolution of the crank-shaft, and this result is best obtained with a comparatively short crank-arm; but in climbing a hill it is desirable to increase the leverage, the same force which will enable the wheel to be driven rapidly along a comparatively level stretch of road being of course inadequate to drive the wheel at the same rate up an incline.

My invention is particularly adapted for use in road-riding and furnishes a convenient and easily-operated means for obtaining the desired changes in leverage to enable the strength of the rider to be conveniently applied under the most favorable conditions on roads of varying grades.

My invention is not limited in its application to a bicycle or like foot-driven vehicle, but may be applied to any device in which it is desired to vary the leverage of a crank-arm by varying the position of a section or attachment pivoted thereto and movable to and away from the axis of rotation.

What I claim as my invention is—

1. The combination with a crank-arm having a broadened outer end, a pedal-block pivoted to the outer end of the crank-arm and hooked over the edge thereof, locking-sockets in the crank-arm and a spring-pawl connected to the pedal-block and adapted to engage the locking-sockets and projecting in a position accessible to the foot of the user of the pedal, substantially as set forth.

2. The combination with a crank-arm having a broadened outer end with a flange and lateral locking-sockets formed in said flange, a swinging pedal-block pivoted to the outer end of the crank-arm and hooked over the edge provided with locking-sockets, a locking-pawl pivoted in the upper end of the pedal-block with its lower end adapted to engage the lateral locking-sockets and its upper end provided with a head located in a position accessible to the foot of the user of the pedal, and a pedal borne on the pedal-block, substantially as set forth.

JAMES S. COPELAND.

Witnesses:
A. M. CARLISLE,
FELTON PARKER.